No. 846,145. PATENTED MAR. 5, 1907.
F. RUDOLPHI & C. J. NELSON.
CAN END SOLDERING MACHINE.
APPLICATION FILED SEPT. 21, 1905.
8 SHEETS—SHEET 4.
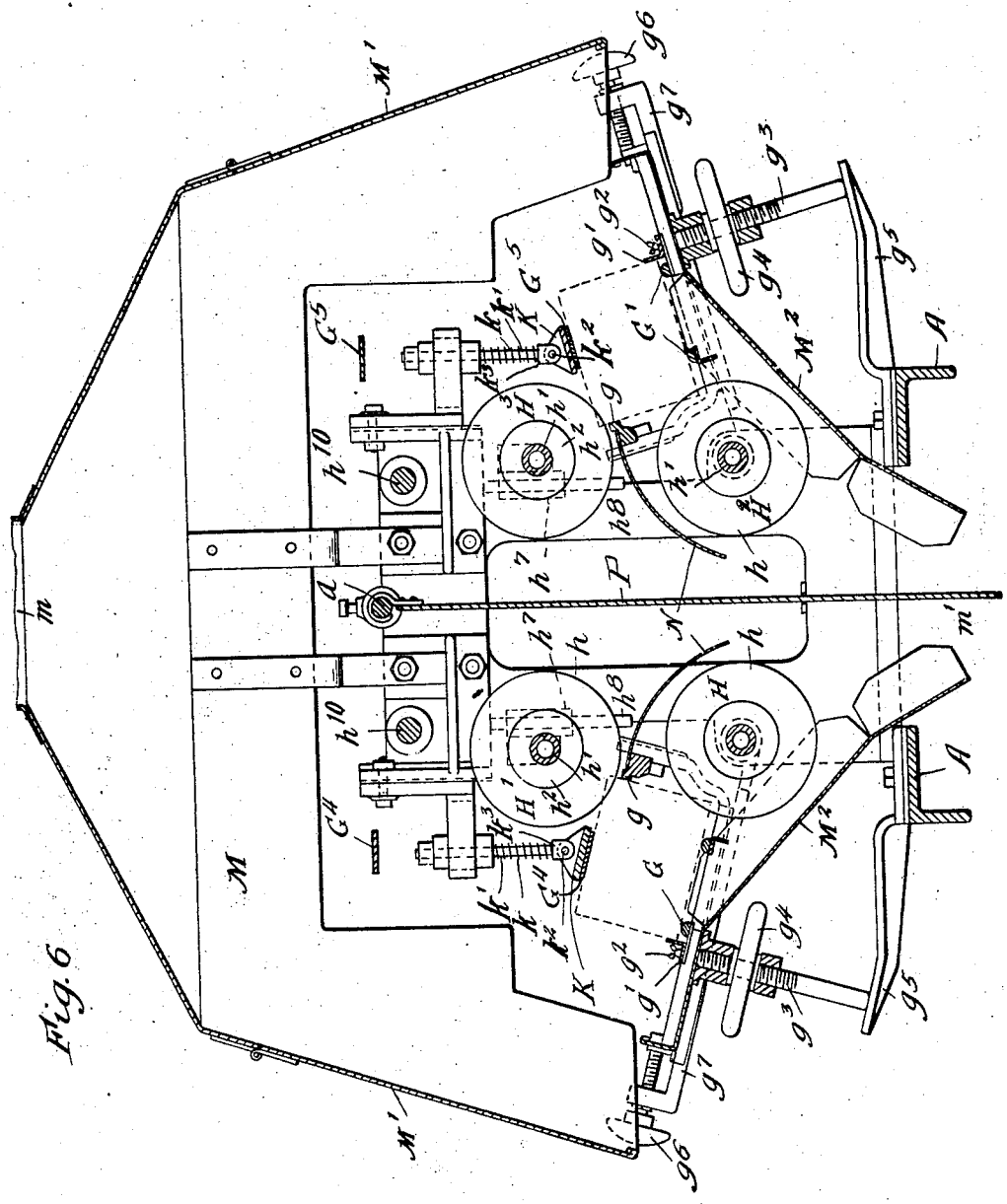

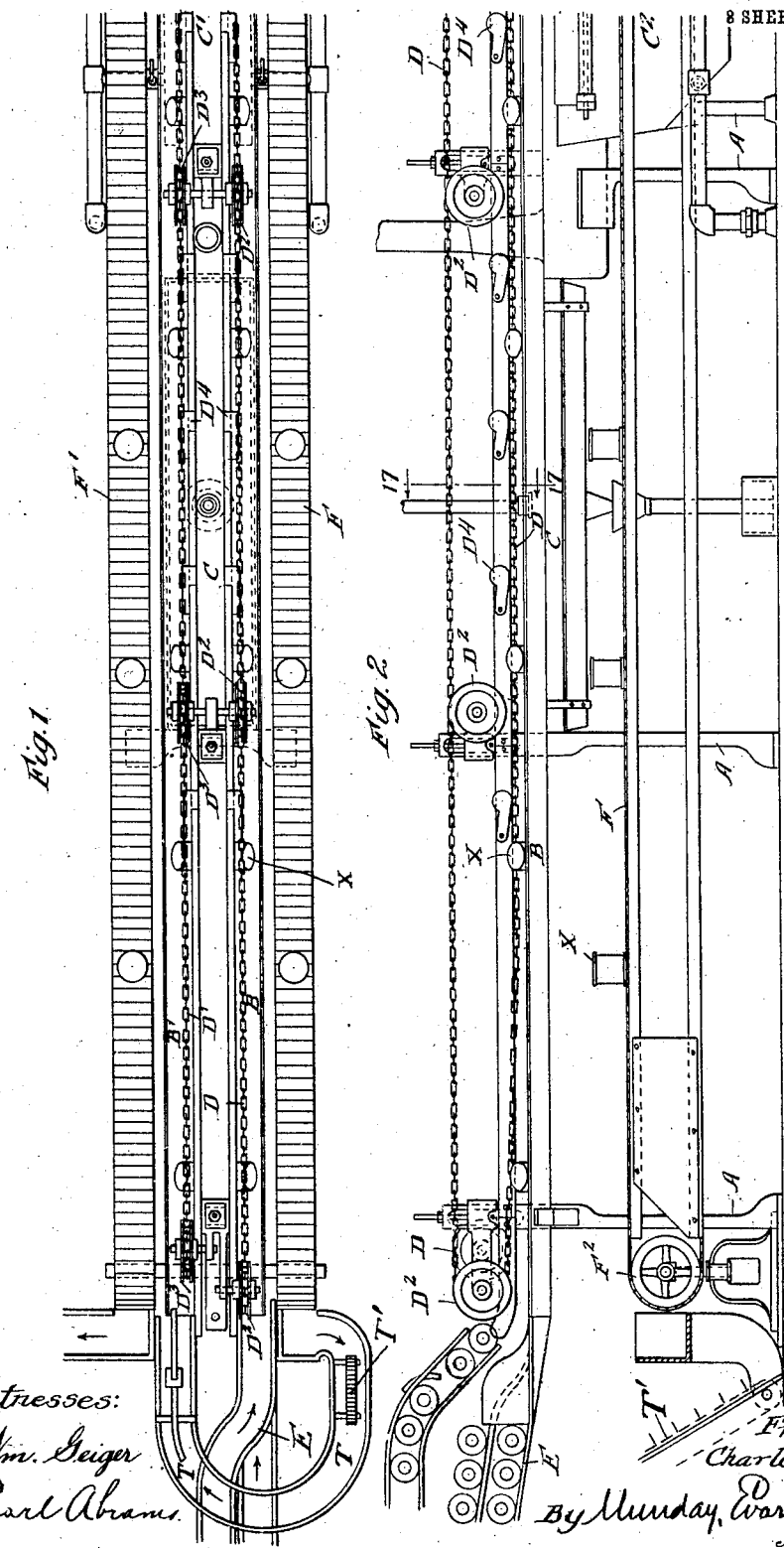

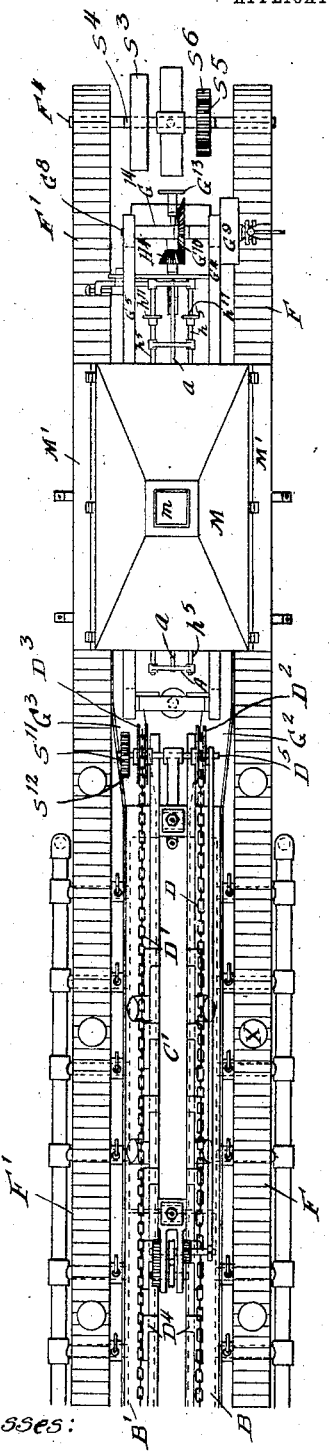

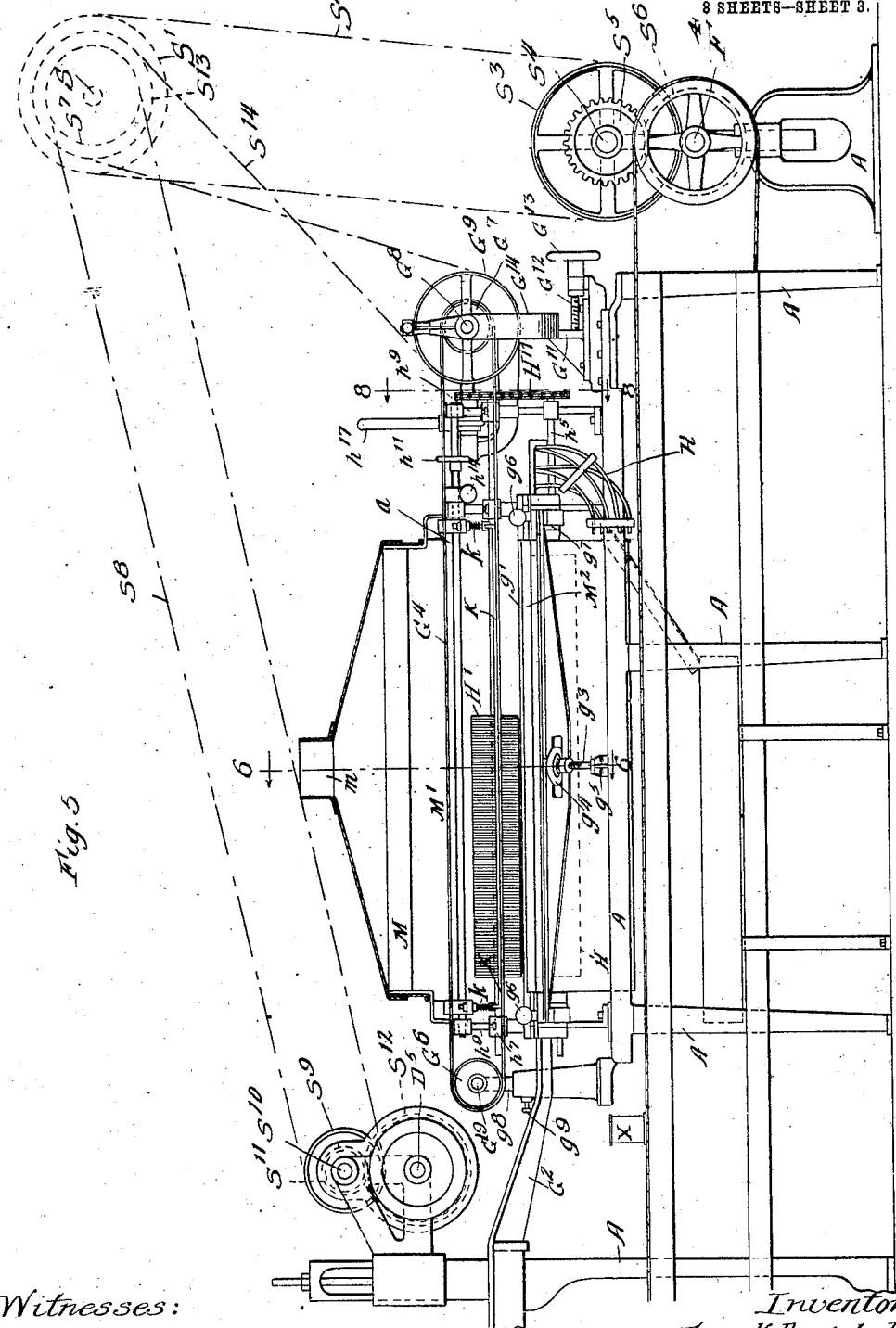

No. 846,145. PATENTED MAR. 5, 1907.
F. RUDOLPHI & C. J. NELSON.
CAN END SOLDERING MACHINE.
APPLICATION FILED SEPT. 21, 1905.
8 SHEETS—SHEET 5.
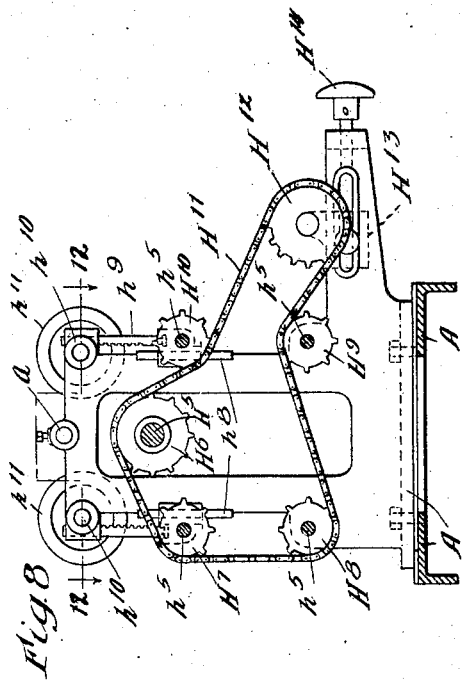
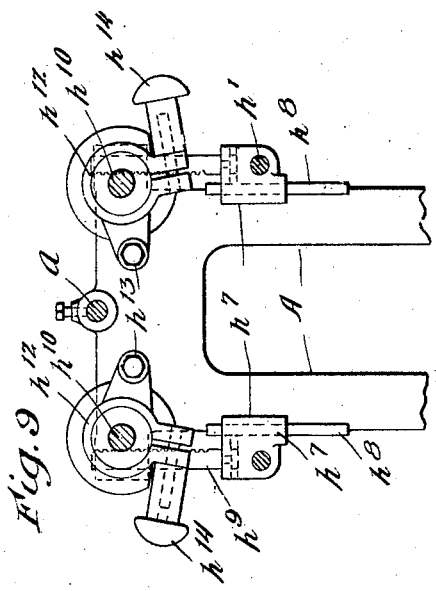
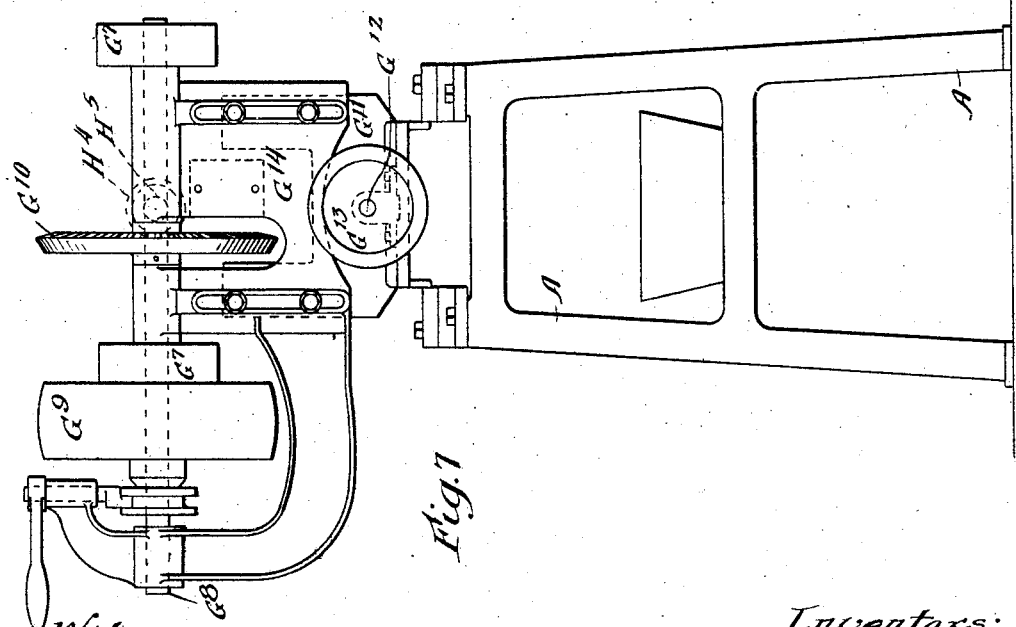
Witnesses:
Wm. Geiger
Pearl Abrams
Inventors:
Frank Rudolphi
Charles J. Nelson
By Munday, Evarts & Adcock.
Attorneys No. 846,145. PATENTED MAR. 5, 1907.
F. RUDOLPHI & C. J. NELSON.
CAN END SOLDERING MACHINE.
APPLICATION FILED SEPT. 21, 1905.
8 SHEETS—SHEET 6.
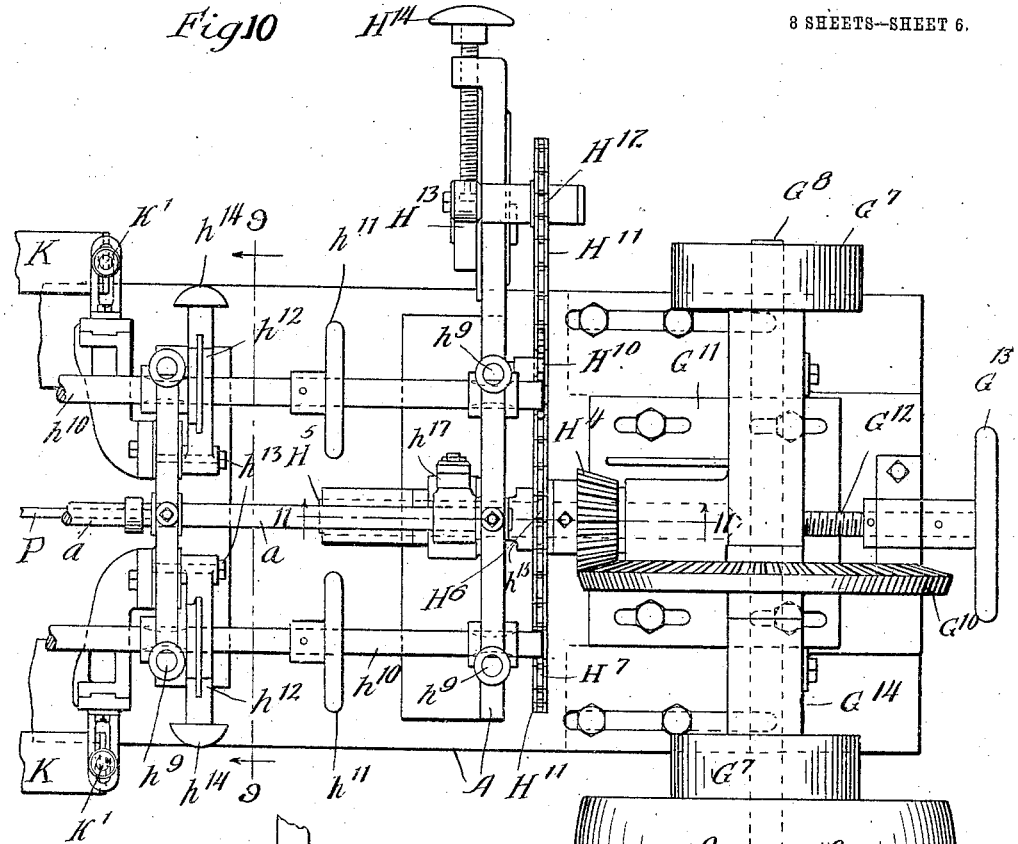
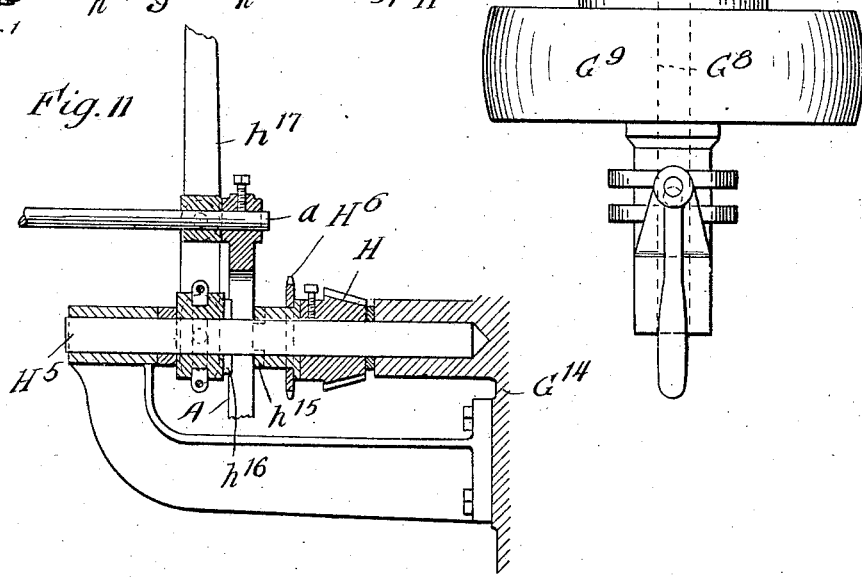
Witnesses:
Wm. Geiger
Pearl Abrams.
Inventors:
Frank Rudolphi
Charles J. Nelson
By Munday, Evarts & Adcock.
Attorneys No. 846,145. PATENTED MAR. 5, 1907.
F. RUDOLPHI & C. J. NELSON.
CAN END SOLDERING MACHINE.
APPLICATION FILED SEPT. 21, 1905.
8 SHEETS—SHEET 7.
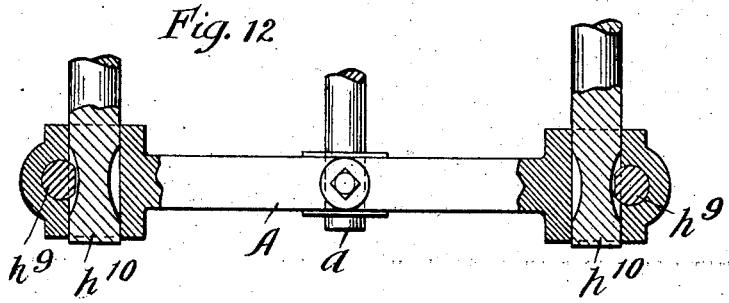
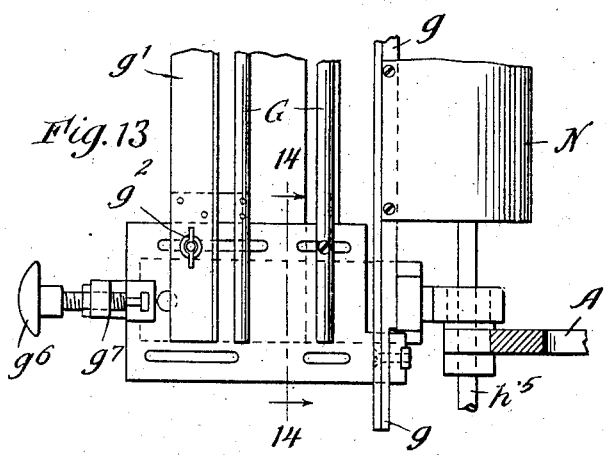
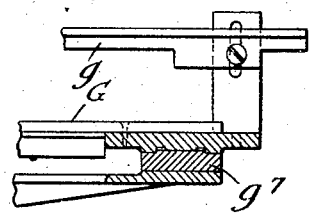
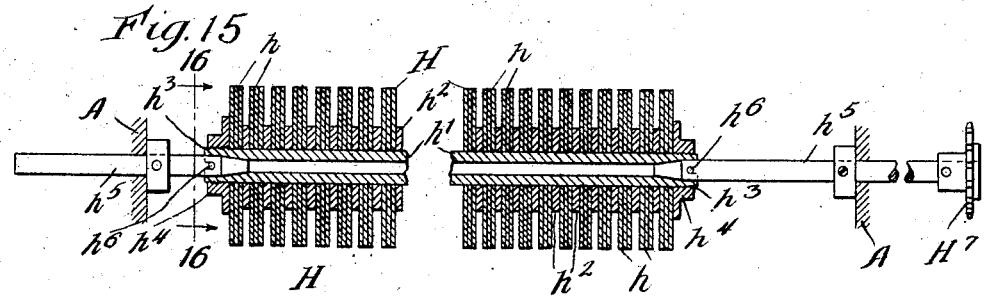
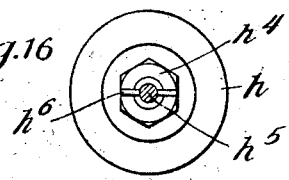
Witnesses
Wm Geiger
Pearl Abrams
Inventors
Frank Rudolphi
Charles J. Nelson
By Munday, Evarts & Adcock
Attorneys No. 846,145. PATENTED MAR. 5, 1907.
F. RUDOLPHI & C. J. NELSON.
CAN END SOLDERING MACHINE.
APPLICATION FILED SEPT. 21, 1905.
8 SHEETS—SHEET 8.
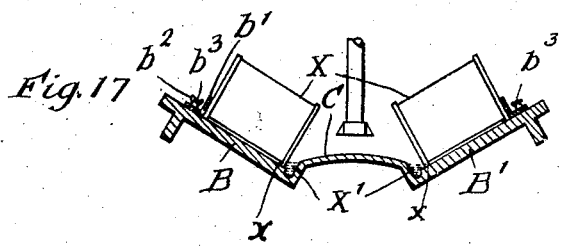
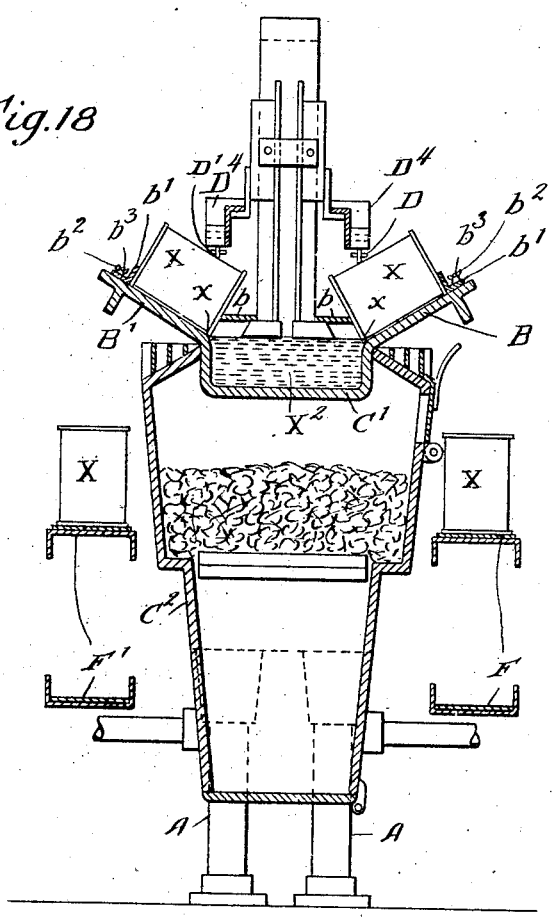
Witnesses:
Wm. Geiger
Pearl Abrams
Inventors
Frank Rudolphi
Charles J. Nelson
By Munday, Evarts & Adcock
Attorneys

UNITED STATES PATENT OFFICE.

FRANK RUDOLPHI AND CHARLES J. NELSON, OF CHICAGO, ILLINOIS, ASSIGNORS TO AMERICAN CAN COMPANY, OF NEW YORK, N. Y., A CORPORATION OF NEW JERSEY.

CAN-END-SOLDERING MACHINE.

No. 846,145.　　　　Specification of Letters Patent.　　　　Patented March 5, 1907.

Application filed September 21, 1905. Serial No. 279,378.

*To all whom it may concern:*

Be it known that we, FRANK RUDOLPHI and CHARLES J. NELSON, citizens of the United States, residing in Chicago, in the county of Cook and State of Illinois, have invented a new and useful Improvement in Can-End-Soldering Machines, of which the following is a specification.

Our invention relates to improvements in machines for soldering the end seams of round cans by rolling them in an inclined position along a runway with the seams over or in contact with molten solder in the solder bath or vessel, and more particularly to improvement in means for removing the surplus solder from the outside corner-surfaces of the cans.

In the machine embodying our invention rapidly-rotating long cylindrical buffers, preferably each composed of a series of circular cloth disks strung upon shafts, are arranged parallel to the runways along which the cans are rolled, so that the solder-coated corner-surfaces of the cans come in contact with the rapidly-rotating buffers as they roll along the runways, and thus remove the surplus solder before the same becomes set and before the cans are delivered to the cooling conveyer or belt, by which the cans are conveyed in an upright position with their seams horizontal while the solder is setting.

Our invention consists in the novel construction of parts and devices and in the novel combinations of parts, and devices herein shown and described.

In the accompanying drawings, forming a part of this specification, Figures 1 and 3, taken together are a plan view of the machine embodying our invention. Figs. 2 and 4 taken together are a side elevation. Fig. 5 is an enlarged detail elevation showing the buffing or solder-removing mechanism. Fig. 6 is an enlarged cross-section on line 6 6 of Fig. 5. Fig. 7 is an end elevation of the solder-removing or buffing mechanism. Fig. 8 is a vertical cross-section on line 8 8 of Fig. 5. Fig. 9 is a cross-section on line 9 9 of Fig. 10. Fig. 10 is a partial plan view showing the driving mechanism for the rotary cylindrical buffers. Fig. 11 is a detail vertical section on line 11 11 of Fig. 10. Fig. 12 is a detail horizontal section on line 12 12 of Fig. 8. Fig. 13 is a partial plan view showing the adjusting mechanism for the can-runways at one end thereof. Fig. 14 is a detail vertical section on line 14 14 of Fig. 13. Fig. 15 is a detail sectional view of one of the rotary cylindrical buffers. Fig. 16 is a cross-section on line 16 16 of Fig. 15. Fig. 17 is a detail vertical section on line 17 17 of Fig. 2. Fig. 18 is a detail section on line 18 18 of Fig. 4.

In the drawing, similar letters of reference indicate like parts throughout all the figures.

In the drawings, A represents the frame of the machine.

B and B' are transversely-inclined can-runways, along which the cans X to be soldered are rolled in an inclined position, so that their corners or seams $x$ come in contact with the acid or flux X' in the fluxing device or vessel C and with the molten solder $X^2$ in the solder bath or vessel C', which are arranged along the runways and beneath the same. The can-runways B and B' are oppositely inclined, so that one end of the can will be lowermost while rolling along one runway and its opposite end lowermost while rolling along the other runway. Each of the runways B and B' is furnished with a lower guide $b$ for the lower ends of the rolling cans to bear against and with an upper guide $b'$ to bear against the upper ends of the cans, the upper guide $b'$ being adjustably secured by clamps $b^2$ and adjusting-screws $b^3$ to adapt the runways to accommodate cans of different lengths. The solder in the solder bath or vessel C' is melted and kept in a molten condition by heaters $C^2$, the heaters being preferably coal-burning furnaces furnished with grates and with flues. The cans are rolled along the runways B B' by endless flexible conveyers D D', preferably chains, traveling on pulleys $D^2 D^3$ and having their lower runs resting directly upon the cans. To increase the grip of the can-rolling conveyers D D' upon the cans, pivoted weights $D^4$ are preferably provided, which rest upon the chains.

E E are can-feed chutes along which the cans to be soldered are delivered to the can-runways B on one side of the machine.

F F' are can-cooling endless conveyers upon which the cans are delivered and conveyed in an upright position with their freshly-soldered seams lowermost and in horizontal position after being subjected to the action of the rotary cylindrical buffers or surplus solder-removing mechanism, so that the cans may be held and conveyed in an upright position while the solder in their seams is cooling or becoming set. The can-cooling conveyers F F' travel on pulleys $F^2 F^3$.

G G' are transversely-inclined adjustable can-runways along which the cans roll while being acted upon by the rapidly-rotating long cylindrical buffers H H' $H^2 H^3$. The buffing or solder-removing can-runways G G' are in line with and extensions of the can-soldering runways B B' and are connected therewith by longitudinally-inclined runways $G^2 G^3$. Each of the buffing or surplus-solder-removing can-runways G G' is furnished with an upper guide or rail $g$ for the inner or lower end of the can to rest against and with an outer guide or rail $g'$ to engage the outer ends of the cans, this latter guide or rail $g'$ being independently adjustable by means of clamp-screws $g^2$ to enable the guide-rails $g'$ to be adjusted to or from the guide or rail $g$ to accommodate cans of different lengths. Each of the can-buffing runways G G' is adjustable up and down to bring the cans rolling along the runways in proper coöperative relation with the rotary cylindrical buffers by means of adjusting-screws $g^3$, furnished with hand-wheels $g^4$, and the lower ends of which bear against brackets $g^5$, secured to the frame. Each of the can-buffing runways G G' is adjusted to and from the rotary cylindrical buffers, so that the cans rolling thereon will be in proper coöperative relation to the buffers by means of adjusting-screws $g^6$, mounted in arms $g^7$ on the frame and bearing against the can-runway. The buffing can-runways are thus adjustable up and down and also to and from the rotary cylindrical buffers. The cans are rolled along the buffing-runways G G' by means of endless flexible conveyers $G^4 G^5$, preferably belts, which travel on pulleys $G^6 G^7$. To increase the grip of the endless belts or conveyers $G^4 G^5$ upon the cans, spring-actuated pressure-shoes K K are employed, which are pressed against the lower run of the belts or conveyers $G^4 G^5$ by springs $k$, surrounding the supporting-stems $k'$. The pressure-shoes K are pivotally connected at $k^2$ to the heads $k^3$, so that the shoes may cause the belt to accommodate itself to the transverse inclination of the runways and to the cans rolling thereon.

Each of the rotary cylindrical buffers H H' $H^2 H^3$ preferably consists of a series of soft flexible textile disks $h$, strung upon a shaft $h'$, with interposed washers $h^2$ of smaller diameter than the disks $h$. The cloth disks and washers are clamped upon the shaft $h'$, which is preferably hollow and furnished with screw-threads $h^3$, by clamp-nuts $h^4$. Each of the hollow shafts $h'$ has a solid extension $h^5$ thereof at each end connected thereto by a pin $h^6$ to enable the buffer and buffer-shaft to be quickly removed by simply taking out the pin $h^6$. The shafts of the two lowermost buffers H $H^2$ are journaled on the stationary frame of the machine in suitable boxes or bearings. The shafts of the two upper buffers H' $H^3$ are, however, journaled in sliding boxes $h^7$, which are moved up and down on suitable guides $h^8$ by a rack $h^9$ engaging a toothed adjusting-shaft $h^{10}$, which is turned by a hand-wheel $h^{11}$ and which is clamped in any position desired by a clamp $h^{12}$, pivoted to the frame at $h^{13}$ and operated by a screw $h^{14}$. By this means the upper buffer of each pair may be moved up and down to any extent desired or required to adapt the machine for operation upon cans of larger or smaller diameters.

M is a hood covering the rotary buffers and having a central opening $m$ at its top for the air. The hood M is furnished with hinged sides or doors M' to facilitate access to the parts inclosed thereby. The hood M has an inclined or hopper-shaped bottom plates $M^2$ below the rotary buffers for deflecting the particles of solder into a collecting or tray below.

N N are curved shields secured to the inner and upper guides $g$ of the buffing-runways G G' and projecting over the two lower buffers H $H^2$.

P is an upright division-plate extending centrally between the two pair of buffers and projecting below the open discharge-mouth $m'$ and serving to prevent particles of solder thrown off centrifugally by one buffer being projected onto the others.

R are curved and twisted guideways, preferably composed of rods for turning the cans from their rolling position after leaving the buffing-runways G G' into an upright position and delivering them onto the cooling-conveyers F F'.

S is the driving-shaft. Motion is communicated from the driving-shaft S to the shaft $F^4$ of the cooling-conveyers F F' from the driving-shaft S by means of a pulley S' thereon, belt $S^2$, pulley $S^3$ on shaft $S^4$, which is furnished with a gear $S^5$, that meshes with a gear $S^6$ on the cooling-belt shaft $F^4$. Motion is communicated from the driving-pulley S to the shaft $D^5$ of the can-rolling conveyers D D' by means of a pulley $S^7$ on the shaft S, belt $S^8$, pulley $S^9$ on counter-shaft $S^{10}$, having a gear $S^{11}$ meshing with a gear $S^{12}$ on the can-rolling conveyer-shaft $D^5$. Motion is communicated from the driving-shaft S to the shaft $G^8$ of the buffing-conveyers $G^4 G^5$ by means of a pulley $S^{13}$ on the driving-shaft S, belt $S^{14}$, and pulleys $G^9$ on the buffing-conveyer shaft $G^8$. A rapid or buffing rotary movement is communicated from the buffing-conveyer shaft $G^8$ to the shafts of the rotary cylindrical buffers H H' H² H³ by means of a large bevel-gear G¹⁰ on the shaft G⁸, which meshes with a small buffer-gear H⁴ on the buffer-driving shaft H⁵, a sprocket-wheel H⁶ on said shaft, and sprocket-wheels H⁷ H⁸ H⁹ H¹⁰ on the several buffer-shafts, respectively, and a connecting-chain H¹¹, which also passes around a chain-tightener pulley or sprocket H¹², which is journaled on a sliding box H¹³, furnished with an adjusting-screw H¹⁴. The driving-shaft G⁸ of the buffing-conveyers G⁴ G⁵ is mounted on an adjustable slide G¹¹, having an adjusting-screw G¹² furnished with a hand-wheel G¹³ for turning the same. The endless flexible buffing-conveyers G⁴ G⁵ may thus be kept under proper tension. The horizontally-adjustable slide G¹¹ for the driving-shaft G⁸ of the buffing-conveyers is furnished with a vertically-adjustable slide G¹⁴, upon which the shaft G⁸ is directly mounted, so that the height of the buffing-conveyers G⁴ G⁵ may be adjusted up and down to accommodate cans of different diameters. The pulley-shaft G¹⁹ at the opposite end of the buffing-conveyers G⁴ G⁵ is also adjustable up and down by means of the sliding stems $g^8$ and set-screw $g^9$. To enable the rotation of the buffers to be stopped at the will of the operator as occasion may require, the sprocket-wheel H⁶ is furnished with a clutch-face $h^{15}$, engaging a sliding clutch $h^{16}$ on the shaft H⁵ and operated by a clutch-lever $h^{17}$, which is pivoted to the tie-rod $a$, which is on the stationary frame of the machine.

T is a looped runway furnished with an elevator T' to receive the cans after one end seam thereof has been soldered and buffed as they come from the cooling-conveyer on one side of the machine and deliver them onto the soldering-runway on the opposite side of the machine with their opposite or unsoldered ends lowermost, the loop runway serving to turn the cans end for end.

We claim—

1. In a machine for soldering the end seams of round cans, the combination with a flux-bath and a solder-bath, of two transversely-inclined solder-runways along which the cans may be rolled in an inclined position, two endless chain conveyers for rolling the cans along the soldering-runways, two horizontally and vertically adjustable buffing-runways, inclines connecting the soldering and buffing runways, two endless belt conveyers for rolling the cans along the buffing-runways, means for vertically adjusting said belt conveyers, two pairs of rapidly-revolving soft cylindrical buffers composed of flexible textile disks arranged parallel to said buffing-runways, two can-cooling conveyers extending along and parallel to said soldering and buffing runways, curved guides for turning and delivering the cans from the runways onto the cooling-conveyers in an upright position, a hood extending over said rotary cylindrical buffers and the buffing-runways, inclined bottom plates having a discharge-mouth, curved shields extending over the two lower rotary cylindrical buffers and an upright division-plate extending between the two pair of rotary cylindrical buffers, substantially as specified.

2. In a machine for soldering the end seams of round cans, the combination with a solder-bath, transversely-inclined soldering-runways, means for rolling the cans along the soldering-runways, horizontally and vertically adjustable buffing-runways, means for rolling the cans along said runways, can-cooling conveyers below the runways, and two pair of rapidly-rotating soft cylindrical buffers arranged longitudinally adjacent to the buffing-runways and engaging the fresh solder-coated outside surface of the cans as they are rolled along said buffing-runways to remove the surplus solder from such surfaces, before the cans are delivered to the cooling-conveyers, substantially as specified.

3. In a machine for soldering the end seams of round cans, the combination with a solder-bath, transversely-inclined soldering-runways, means for rolling the cans along the soldering-runways, horizontally and vertically adjustable buffing-runways, means for rolling the cans along said runways, can-cooling conveyers below the runways, and two pair of rapidly-rotating soft cylindrical buffers arranged longitudinally adjacent to the buffing-runways and engaging the fresh solder-coated outside surface of the cans as they are rolled along said buffing-runways to remove the surplus solder from such surfaces, before the cans are delivered to the cooling-conveyers, and means for vertically adjusting the two upper rotary cylindrical buffers, substantially as specified.

4. In a machine for soldering the end seams of round cans, the combination with a solder-bath, a soldering-runway along which the cans are rolled, means for rolling the cans along said runway, a vertically and horizontally adjustable buffing-runway, means for rolling the cans along said buffing-runway, and a pair of rapidly-rotating soft, flexible cylindrical buffers engaging the outside solder-coated surfaces of the cans as they are rolled along the runway, substantially as specified.

5. In a machine for soldering the end seams of round cans, the combination with a solder-bath, a soldering-runway along which the cans are rolled, means for rolling the cans along said runway, a vertically and horizontally adjustable buffing-runway, means for rolling the cans along said buffing-runway, and a pair of rapidly-rotating soft, flexible cylindrical buffers engaging the outside solder-coated surfaces of the cans as they are rolled along the runway, and a cooling-conveyer below said runways, substantially as specified.

6. In a machine for soldering the end seams of round cans, the combination with a solder-bath, a soldering-runway along which the cans are rolled, means for rolling the cans along said runway, a vertically and horizontally adjustable buffing-runway, means for rolling the cans along said buffing-runway, and a pair of rapidly-rotating soft, flexible cylindrical buffers engaging the outside solder-coated surfaces of the cans as they are rolled along the runway, and a cooling-conveyer below said runways, and means for turning and delivering the cans from their rolling position on said runways into an upright position on said cooling-conveyers, substantially as specified.

7. In a machine for soldering the end seams of round cans, the combination with a solder-bath, soldering-runways for the cans, means for rolling the cans along said soldering-runways, cooling-conveyers, buffing-runways, means for rolling the cans along said buffing-runways, two pair of rapidly-rotating soft, flexible cylindrical buffers engaging the outside solder-coated surfaces of the cans as they roll along the runways, a hood surrounding and inclosing the said rotary buffers and the buffing-runways, inclined bottom plates beneath said hood and the rotary buffers and an upright division-plate extending between the two pairs of buffers, substantially as specified.

8. The combination with a soldering-runway and solder-bath, of a cooling-conveyer, a buffing-runway, rotary cylindrical buffers parallel to the buffing-runway and means for adjusting the buffing-runway up and down, substantially as specified.

9. The combination with a soldering-runway and solder-bath, of a cooling-conveyer, a buffing-runway, rotary cylindrical buffers parallel to the buffing-runway and means for adjusting the buffing-runway up and down, and means for adjusting the buffing-runway to and from the buffers, substantially as specified.

10. The combination with a soldering-runway and solder-bath, of a cooling-conveyer, a buffing-runway, rotary cylindrical buffers parallel to the buffing-runway and means for adjusting the buffing-runway up and down, and means for adjusting the buffing-runway to and from the buffers, and means for vertically adjusting the upper buffer, substantially as specified.

Signed at Chicago this 19th day of September, 1905.

FRANK RUDOLPHI.
CHARLES J. NELSON.

Witnesses:
H. M. MUNDAY,
PEARL ABRAMS.